United States Patent [19]
Young et al.

[11] Patent Number: 6,102,644
[45] Date of Patent: Aug. 15, 2000

[54] EJECTOR BLADE CARRIAGE ADJUSTER

[75] Inventors: David A. Young, Sunderland, United Kingdom; Peter F. Prillinger, Dunlap, Ill.; David Suthern, Tyne Wear; Christopher Smith, Tyne & Wear, both of United Kingdom; John P. Moyna, Elkader, Iowa

[73] Assignee: Caterpillar S.A.R.L., Geneva, Switzerland

[21] Appl. No.: 09/272,140

[22] Filed: Mar. 19, 1999

[51] Int. Cl.$^7$ ........................................................ B60P 1/00
[52] U.S. Cl. ........................... 414/517; 414/513; 414/813; 198/747; 37/417
[58] Field of Search .................................... 414/492, 511, 414/513, 517, 521, 525.2, 525.6, 725, 813; 403/243, 247, 299, 365; 198/747; 37/417

[56] References Cited

U.S. PATENT DOCUMENTS

| | | |
|---|---|---|
| 1,856,441 | 5/1932 | Standfuss . |
| 2,047,602 | 7/1936 | Tomlinson ................................ 214/82 |
| 2,179,726 | 11/1939 | Lewis et al. .............................. 214/82 |
| 2,408,284 | 9/1946 | Anthony .................................... 214/67 |
| 2,876,918 | 3/1959 | Kling ......................................... 214/82 |
| 2,911,119 | 11/1959 | Kuhnau .................................... 214/82 |
| 3,007,589 | 11/1961 | Galloway .................................. 214/82 |
| 3,247,984 | 4/1966 | Gregory, Sr. et al. .................... 214/82 |
| 3,352,439 | 11/1967 | Hardwick ................................. 214/82 |
| 3,488,870 | 1/1970 | Holets et al. ............................. 37/129 |
| 3,768,672 | 10/1973 | Grooss ..................................... 414/517 |
| 3,778,174 | 12/1973 | Molby ................................. 403/365 X |
| 3,815,764 | 6/1974 | Gilfillan et al. ........................... 214/82 |
| 3,831,789 | 8/1974 | Brewer ..................................... 214/82 |
| 4,011,670 | 3/1977 | Hutchings et al. ....................... 37/417 |
| 4,041,635 | 8/1977 | Fisher et al. ........................ 414/513 X |
| 4,055,007 | 10/1977 | Johnson .............................. 414/513 X |
| 4,071,153 | 1/1978 | Booher ..................................... 414/513 |
| 4,194,760 | 3/1980 | Shiomi ..................................... 280/661 |
| 4,505,632 | 3/1985 | Quenzi ................................ 414/517 X |
| 4,516,904 | 5/1985 | Simmons ................................. 414/517 |
| 5,311,923 | 5/1994 | Cobes et al. ............................. 164/430 |
| 5,456,521 | 10/1995 | Moyna ..................................... 298/1 B |
| 5,513,942 | 5/1996 | Pickrell ................................. 414/525.2 |
| 5,803,433 | 9/1998 | Brocard et al. .......................... 251/337 |

*Primary Examiner*—James W. Keenan
*Attorney, Agent, or Firm*—August E. Roehrig, Jr.

[57] ABSTRACT

An ejector blade carriage mounting system for connecting the ejector blade carriage to the ejector blade in a manner to accommodate variations in the fabrication of a truck body in which the ejector blade is utilized by connecting the ejector blade carriage to the ejector blade through a tri-pod arrangement of mounting bolts which incorporate shims and spherical seating washers to compensate for such variations and to ensure true axial loading of the connecting bolts. A fourth connecting bolt is provided to help lock the assembly in the desired position once the spacial accommodations have been effected.

10 Claims, 6 Drawing Sheets

EJECTOR BLADE CARRIAGE ADJUSTER

DESCRIPTION

1. Technical Field

This invention relates to a system for adjusting the spacial relationship between a vehicle and an ejector blade carriage used for supporting an ejector blade carried in the vehicle and, more particularly, to an ejector blade carriage adjusting system for adjusting the spacial relationship between the ejector blade carriage and the vehicle in which the ejector blade is carried to accommodate variations in the fabrication and assembly of these components.

2. Background Art

The use of ejector blades to remove materials carried within a vehicle, such as articulated off-highway trucks, is well known. The ejector blades used with such vehicles are connected to a hydraulic cylinder or ram which is used to move the ejector blade from a load position, wherein the vehicle is filled with materials, to a discharge position wherein the materials carried within the vehicle are removed by operation of the ejector blade. When the ejector blade is in the load position, material may be freely loaded into the vehicle for transport to another location. When it is desired to discharge these materials, the ejector blade is moved from the load position towards the discharge position and the materials loaded into the vehicle are discharged therefrom by the ejector blade pushing the materials out from the body of the vehicle through an unloading gate.

As is known to those skilled in the art, the ejector blade is carried on rollers positioned at the bottom thereof to engage the floor of the vehicle body. The top portion of the ejector blade has attached thereto, at each side thereof, a "carriage" which is coupled to the upper portion of the ejector blade and extends over the top of the vehicle body sides for engaging a top rail and a side rail carried by the upper portion of the vehicle body.

Each ejector blade carriage assembly includes two sets of rollers, one set of which engages the vehicle top rail and the other set of rollers engages the vehicle side rail to guide and support the ejector blade as it moves between the load and discharge positions.

Because of slight differences in the fabrication of the body top rail which is positioned along each side of the vehicle body, and the ejector blade attachment bell crank, it is frequently desirable to provide for small adjustments at the carriage/ejector blade attachment to compensate for these fabrication differences. In addition, many times it is desirable to provide an adjustment for variations in the vehicle body width over the top rails. By adjusting the sets of rollers which engage the body top rail, and the body side rail, correct tracking of the appropriate carriage rollers may be achieved to allow for slight variation in vehicle body widths and fabrication differences. In addition, providing for adjustment of the spacing between the two joined plates which form the ejector blade carriage and the connection to the ejector blade, facilitates correct tracking of the ejector blade as it moves within the vehicle body.

In U.S. Pat. Nos. 1,856,441; 2,047,602; 3,352,439; and 4,516,904, structures are disclosed which utilize rollers engaging a portion of a vehicle body to assist in movement of an ejector mechanism throughout the vehicle body to assist in the removal of the material contained therein. Each of these patents disclose the use of rollers for engaging a portion of the vehicle to assist in the movement of the moveable bulkhead plate, or ejector blade, which conforms to the cross-sectional shape of the vehicle body. None of these patents, however, appear to disclose any manner for adjusting the positional relationship of the rollers/or and the surface of the vehicle with which they engage.

In U.S. Pat. No. 2,179,726, there is disclosed a structure for connection to a moveable bulkhead used for removal of materials carried within a truck body. This structure utilizes rollers positioned at different points to provide rolling contact between the moveable bulkhead, and the bottom of the vehicle body, and between the moveable bulkhead and sides of the vehicle body. Each of the rollers which engage the sides of the vehicle body may be individually adjusted by changing the securing bolts to adjust an interior bushing for each of the horizontally mounted rollers. It is also disclosed that suitable shims may be placed under the brackets supporting the individually vertically mounted rollers to adjust the bearing of these rollers against the sides of the vehicle body.

In U.S. Pat. No. 2,876,918, it is disclosed that the horizontally and vertically mounted ejector blade support rollers are each individually supported by an eccentric, to adjust the point of contact of each roller, and that the axial position of an individual roller can be adjusted by the use of shims positioned between the end of the eccentric shaft and the roller supporting bracket.

U.S. Pat. No. 3,488,870 also discloses the use of an eccentric for positioning an ejector blade support roller relative to the scraper bowl and frame.

This invention is directed to overcoming one or more of the problems or concerns set forth above, and attaining the desired improvements.

DISCLOSURE OF THE INVENTION

In the preferred embodiment of this invention, a tri-bolt joinder of the ejector blade carriage and the ejector blade permits adjustments therebetween to compensate for variations in the fabrication of the vehicle body top rail and ejector blade attachment bell crank. The tri-bolt arrangement also permits adjustment of the ejector blade carriage to accommodate for variation in the area of the truck body width over the vehicle top rails, and facilitates correct tracking of the carriage rollers which engage the vehicle body top rail, and the carriage rollers which engage the vehicle body side rail, to correct for improper pitch and yaw, respectively, as the ejector blade moves through the vehicle body.

In accommodating for correct tracking of the carriage rollers, and to accommodate light variations in vehicle body width occurring during the fabrication process, the bolted joints between the ejector blade carriage and the ejector blade must accommodate these necessary adjustments. Accordingly, a tri-bolt arrangement, three bolts placed in a triangular pattern, will permit such accommodations to be made. By placing shims of different thicknesses between each of the joint faces where each one of joinder bolts passes therebetween, adjustment to the joint face may also be accomplished. Because such bolting will create an angle between the joint faces which would effectively subject the joinder bolts to bending as the bolts are tightened, a spherical seating washer is used in the joint, in addition to the spacing shims. Such a spherical washer will take up the misalignment which will occur between the joint faces at each bolt as a result of the mating surfaces not lying in parallel planes, thereby removing the bending stress, and allowing true axial bolt loading.

Related methods and other features and other advantages of the present invention will be apparent from the following description and the accompanying drawings.

BEST MODE FOR CARRYING OUT THE INVENTION

Figure 1:
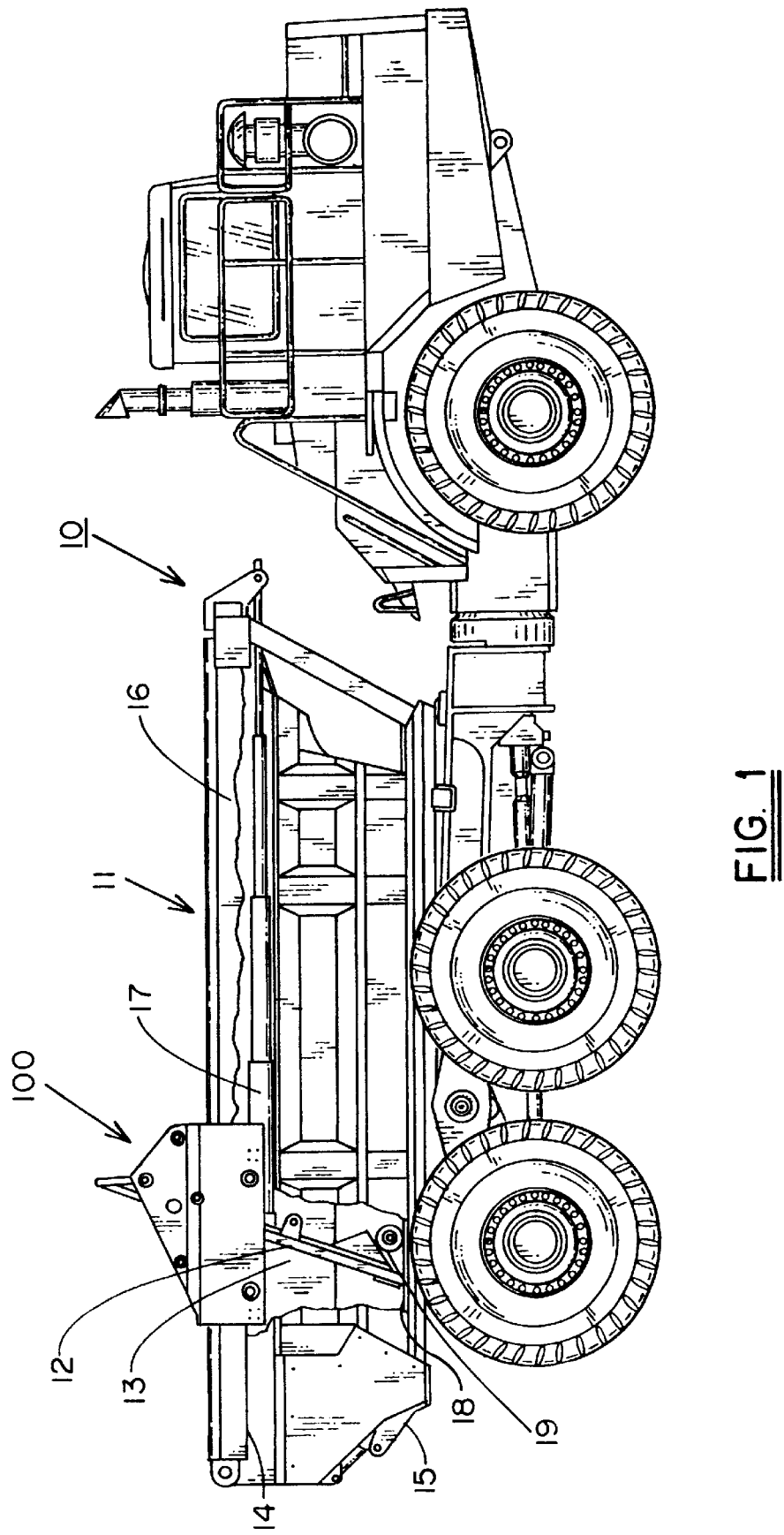
FIG. 1 is a side elevation view of an exemplary vehicle, an off-highway truck, having an ejector blade to facilitate discharge of the materials carried within the truck body and with which this invention is used.

Referring now to FIG. 1, this invention is illustrated in use on a construction work machine, such as an articulated off-highway truck 10. It will be understood, however, that the use of this invention is equally applicable to any other vehicle which utilizes an ejector blade 12 to assist in the removal of materials carried by the vehicle, as well as the off-highway truck 10 illustrated.

In general, the truck 10 includes a truck body portion 11 into which materials are loaded to be carried by the truck to another location whereat the materials are discharged. To assist in the discharge of the materials carried in the truck body 11, an ejector blade 12 is used to push the materials from the truck body 11 through an unloading gate 15 at the rear end of the vehicle truck body. To this end, the ejector blade 12 is moved from a first or load position, at the forward end of the truck body 11, to a discharge position adjacent to the unloading gate 15 at the rear of the vehicle truck body by operation of a hydraulic ram 17, as is known to those skilled in the art.

Figure 2:
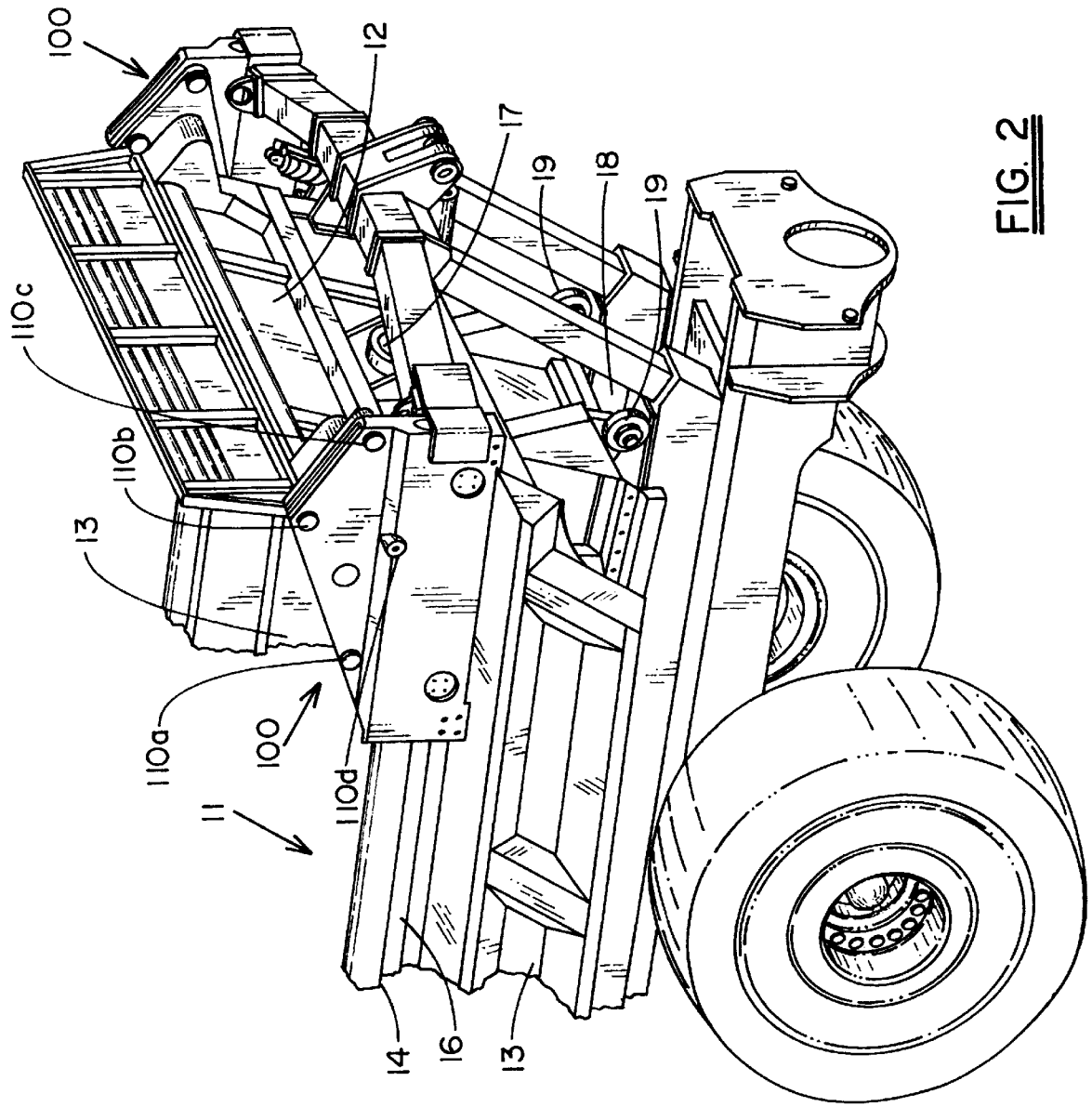
FIG. 2 is a partial perspective view of the front portion of the vehicle body of FIG. 1, to illustrate the joinder between the ejector blade carriage and the ejector blade incorporating the invention.

As is best illustrated in FIG. 2, the lower center portion of the ejector blade 12 is supported by a pair of rollers 19 which move over the floor 18 of the truck body, and position the lowermost portion of the ejector blade 12 adjacent to the body floor 18 to facilitate removal of the materials carried within the truck body 11. The ejector blade 12 has an overall shape which conforms to the interior of the truck body 11 such that upon activation of the hydraulic ram 17, the ejector blade 12 will move substantially the entire length of the truck body 11 in conformance with the shape of the vehicle interior.

The upper portion of the ejector blade 12 is supported by an ejector blade carriage 100 which is connected at each side of the ejector blade 12 and supported by the side walls 13 of the truck body 11 to move over the surface thereof in response to the movement of the hydraulic ram 17. The joinder between the ejector blade carriage 100 and the ejector blade 12 is best illustrated in FIGS. 3 and 4, which also illustrate the manner in which the carriage 100 engages the truck body 11 to facilitate appropriate alignment between the ejector blade carriage 100 and the ejector blade 12, as well as between the ejector blade carriage 100 and the vehicle truck body 11.

As is known to those skilled in the art, the ejector blade 12 is joined to an ejector blade carriage 100 for movement therewith to guide the ejector blade 12 as it moves between the load and discharge positions in response to movement of the hydraulic ram 17. To this end, the ejector blade 12 is secured at its upper position to the ejector blade carriage 100. While it is understood that the ejector blade 12 is connected to an ejector blade carriage 100 at each side of the ejector blade, for convenience of illustration only one ejector blade carriage 100 will be described in detail, as the other side is a mirror image thereof.

Figure 3:
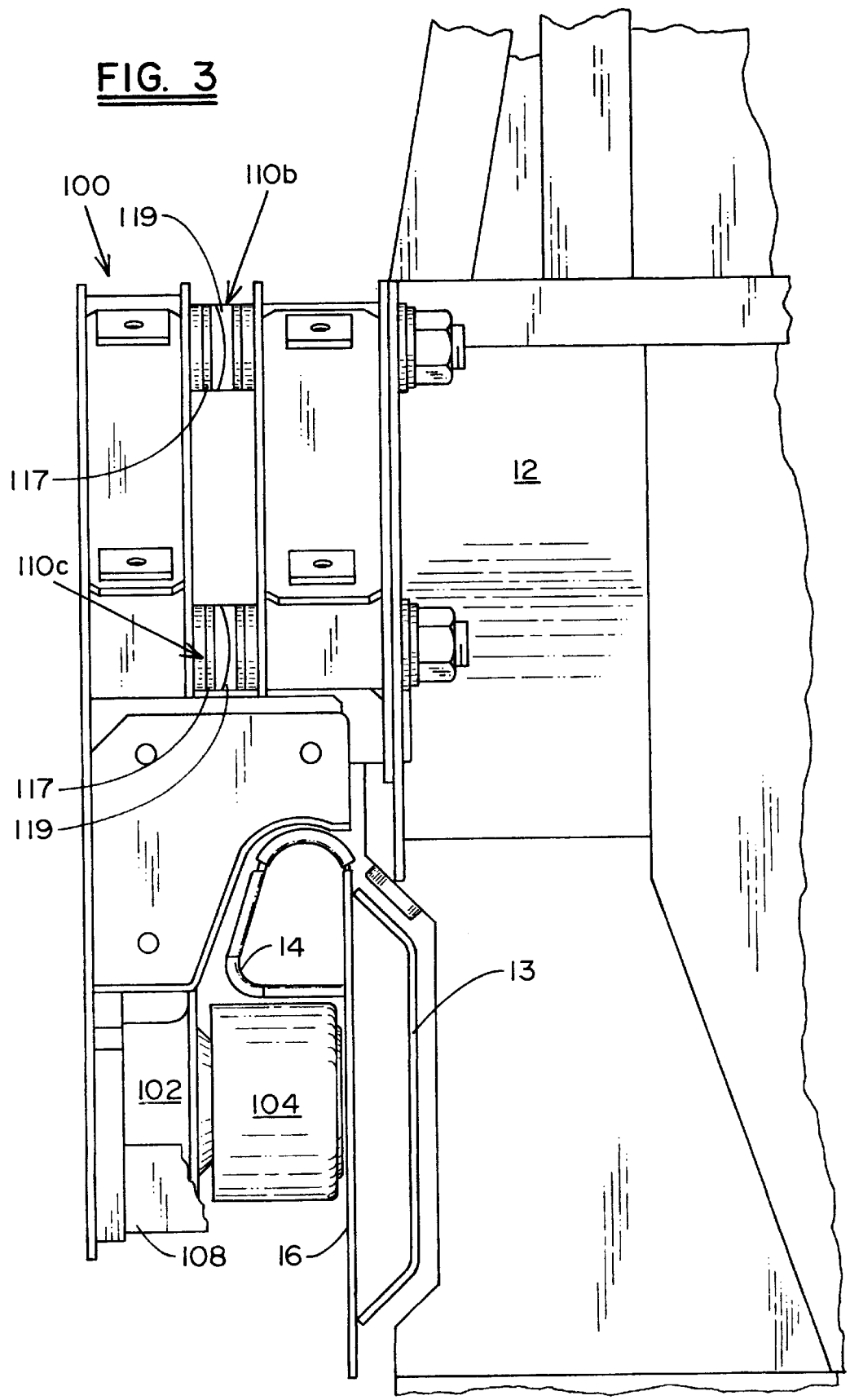
FIG. 3 is an enlarged partial elevation of a portion of the truck body illustrated in FIGS. 1 and 2, with portions broken away, for better illustrating the joinder between the ejector blade carriage and the ejector blade, and the engagement of the top rail roller with the top rail of the vehicle body.
Figure 4:
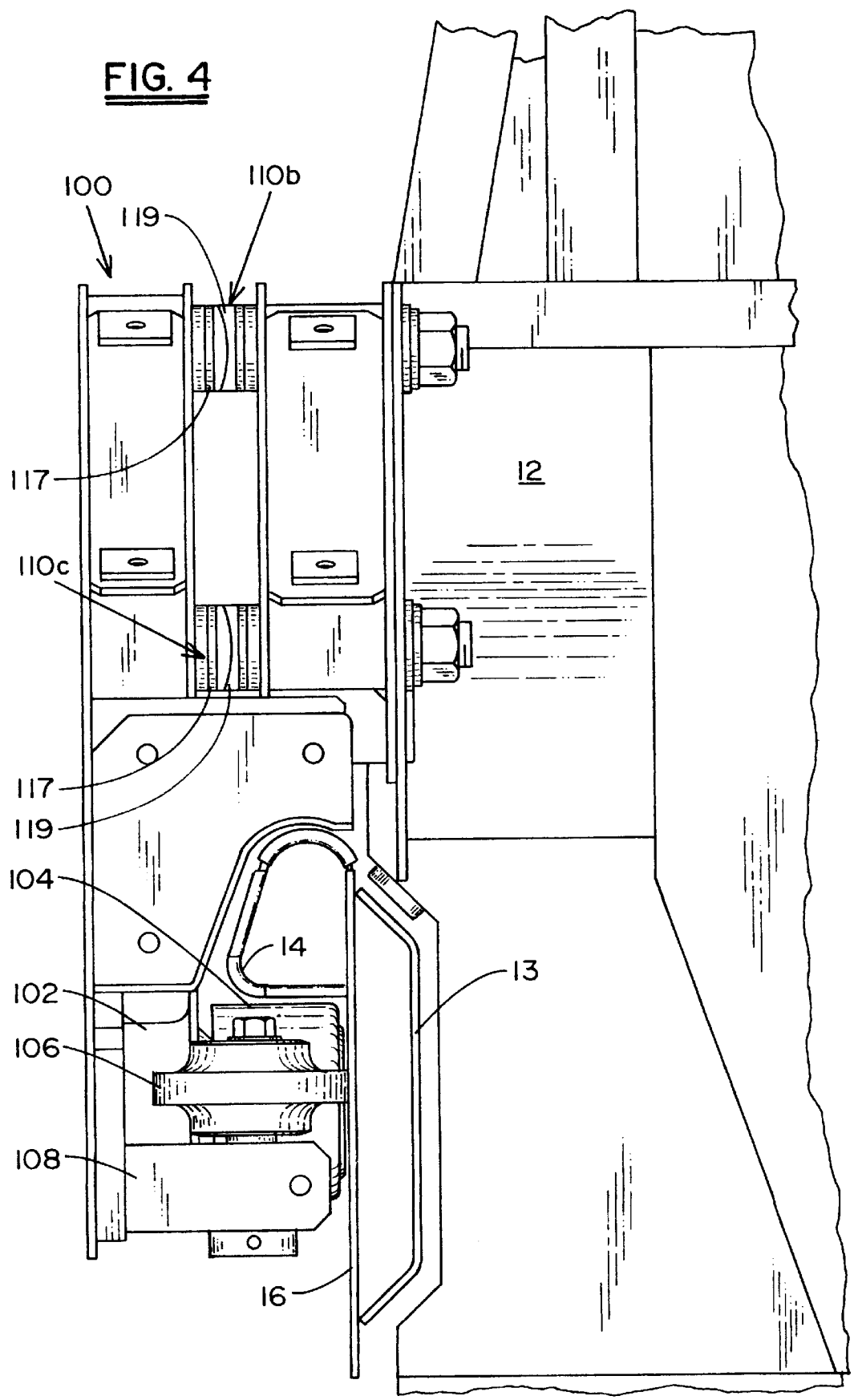
FIG. 4 is an enlarged partial elevation of a portion of the truck body illustrated in FIGS. 1 and 2, with portions removed to better illustrate the joinder between the ejector blade carriage and the ejector blade, and the mounting of the side rail rollers carried by the ejector blade carriage to engage the vehicle side rail.

As best shown in FIGS. 2–4, the ejector blade 12 is shaped to conform substantially to the interior of the vehicle body 11, and the upper portion of the ejector blade 12 is joined to the ejector blade carriage 100 by a plurality of bolts 110. Three of the bolts 110a, 110b and 110c are positioned in a triangular configuration to adjust the ejector blade carriage 100 for tow in and tow out in a longitudinal sense and also to rotate the ejector blade carriage 100 in a vertical sense to provide for inaccuracies in a vehicle top rail 14 which is secured along the exterior of the upper open portion of the vehicle body 11. A fourth bolt 110d is optionally provided to lock the ejector blade carriage 100 in the proper position after the adjustments of the tri-bolts 110a, 110b and 110c have been completed to accomplish one or more of these purposes.

Referring now to FIG. 3, the ejector blade carriage 100 is secured to the ejector blade 12 by the adjusting bolts 110a, 110b and 110c, two of which are shown in this figure. The ejector blade carriage 100 includes a bracket 102 extending therefrom, and upon which is mounted a top rail roller 104 which is positioned adjacent to and spaced from the vehicle body top rail 14 for engagement with the adjacent face of the vehicle top rail 14. In this manner, when the hydraulic ram 17 is actuated to move the ejector blade 12 between the load and discharge positions, the top rail roller 104 will engage the adjacent surface of the top rail 14 to position the ejector blade 12 correctly during such movement. Side rail rollers 106, best illustrated in FIG. 4, are provided on each of the ejector blade carriages 100 mounted on a bracket 108 extending from the carriage 100 towards the vehicle body side rail 16, to engage the vehicle side rail 16 during movement of the ejector blade 12 between the load and discharge positions to guide the movement thereof relative to the interior of the vehicle body 11.

Figure 5:
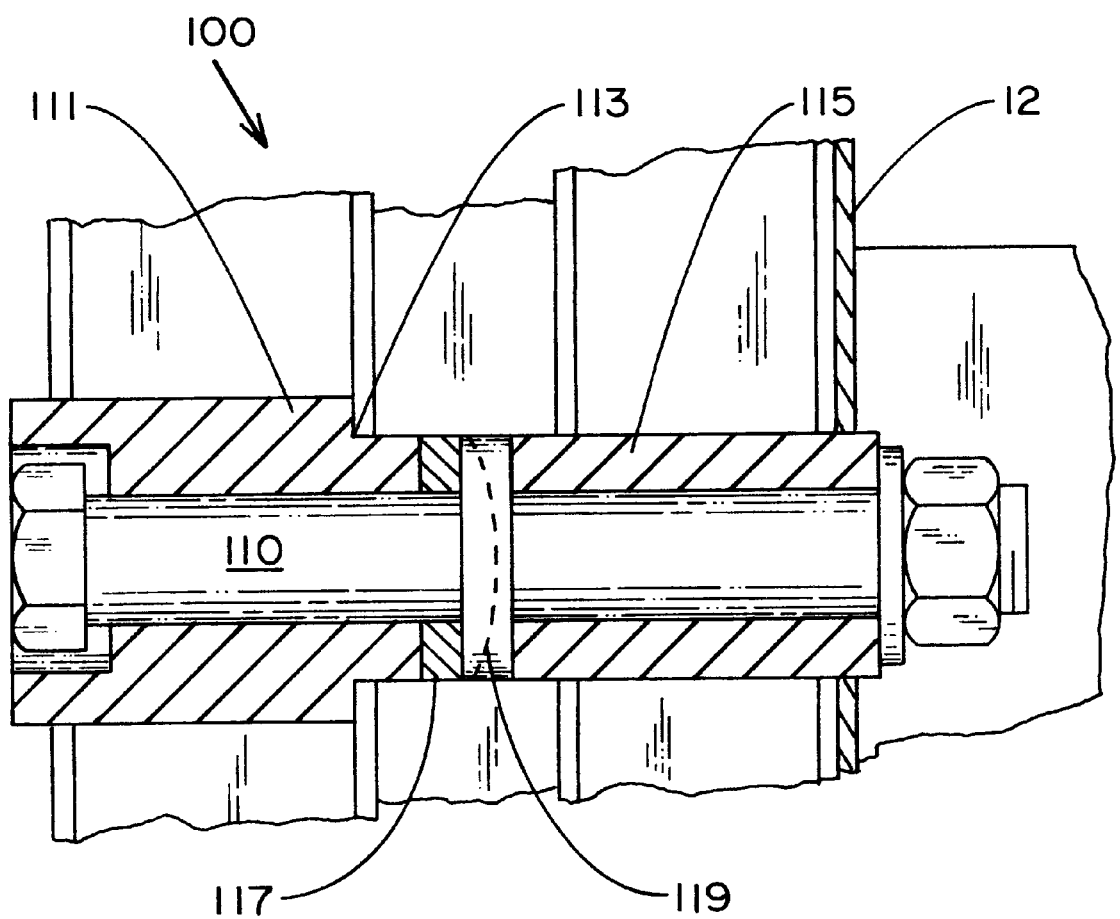
FIG. 5 is an enlarged cross-sectional view of the configuration of a typical bolt used to join the ejector blade carriage and the ejector blade, to better illustrate the manner in which shims and a spherical seating washer are incorporated into the bolting structure.
Figure 6:
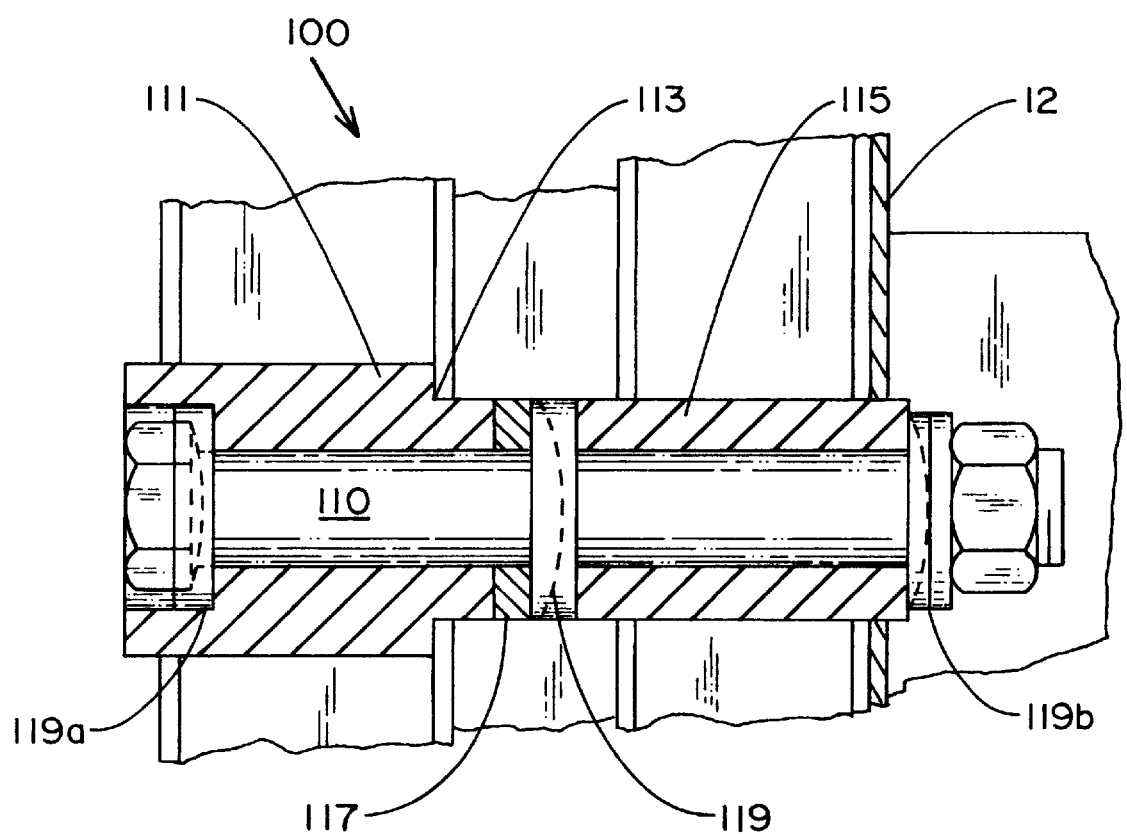
FIG. 6 is an enlarged cross-sectional view of an alternative configuration of a typical bolt used to join the ejector blade carriage and the ejector blade, to better illustrate the manner in which large shims and multiple spherical seating washers are incorporated into the bolting structure to accommodate larger spacial displacements.

To provide for various adjustments between the ejector blade carriage 100 and the ejector blade 12 to accommodate such things as differences in the width of the vehicle body top rail 14 and to adjust for different variations in the fabrication of the vehicle components and alignment, each of the three adjustment bolts 110a, 110b and 110c, as well as the lock bolt 110d, are formed in the manner illustrated in FIGS. 5 and 6. To this end, each of these bolts has associated therewith a recessed bushing 111 having a shoulder portion 113 for engaging the ejector blade carriage 100 and coupling a force thereto transmitted through the bolts. A second bushing 115 is carried by the ejector blade 12 and the bolts 110 pass therethrough to transmit the force applied to the bolts for coupling the ejector blade 12 to the ejector blade carriage 100.

In order to provide the desired spacial relationship between the ejector blade 12 and the ejector blade carriage 100, such as to accommodate variations in the width of the vehicle body top rail 14, or to adjust the ejector blade carriage 12 for tow in and/or tow out in a longitudinal sense, or to rotatably position the ejector blade carriage 100 in a vertical sense, a space is provided between the two bushings 111 and 115 to accommodate the placement of shims 117 to control the spacing between the adjacent ejector blade 12 and the ejector blade carriage 100. Because certain of these desired spacial relationships will result in the lack of parallelism between the adjacent faces of the ejector blade 12 and the ejector blade carriage 100, depending upon the amount of divergence from parallel between the two faces, one or more spherical seating washers 119 are positioned on the adjustment bolts 110a, 110b and 110c, and lock bolt 110d.

As illustrated in FIG. 5, when a small amount of displacement is required, a single spherical seating washer 119 positioned between the two bushings 111 and 115 adjacent to shims 117 is sufficient to eliminate a bending stress being imposed on the bolt 110, and to ensure that the load applied to the bolt 110 upon tightening is applied in an axial direction.

When the displacement between the adjacent faces of the ejector blade 12 and the ejector blade carriage 100 is increased, creating a greater divergence from parallel therebetween which cannot be accommodated by a single spherical seating washer 119, one or more additional spherical washers are to be used. As illustrated in FIG. 6, additional spherical washers 119a and/or 119b can be used at either end of bolt 110 to achieve the desired result of minimizing any bending force being applied to the bolts 110 upon tightening, and ensuring that the load applied to the bolts 110, upon tightening, are applied in an axial direction.

Industrial Applicability

In operation, when it is necessary to adjust the ejector blade carriage 100 to accommodate for variations in the fabrication of the vehicle truck body 11, such an adjustment may be accomplished by the use of spacers or shims 117 positioned between the ejector blade carriage 100 and the ejector blade 12. These shims 117 are placed on whichever of the three ejector blade carriage mounting bolts 110a, 110b and 110c that will give the proper positioning of the ejector blade carriage 100 relative to the ejector blade 12. For example, when it is necessary to accommodate tow in and tow out in a longitudinal sense, the carriage bolts individually may have different sized shims 117 to provide the desired tow in/tow out adjustment. When it is necessary to accommodate variations in the thickness of the body top rail, for example, additional shims 117 might be added to all three of the ejector blade carriage mounting bolts 110a, 110b and 110c.

As is apparent, because of the tri-pod arrangement of the three ejector blade carriage mounting bolts 110a, 110b and 110c, variations in the size of the space and the number of shims 117 between these bolts can result in a lack of parallelism between the mounting surface of the ejector blade 12 and the facing surface of the ejector blade carriage 100. Accordingly, the presence of one or more spherical seating washers 119, 119a and/or 119b on each of the mounting bolts 110a, 110b and 110c, as well as the locking bolt 110d, will permit an axial loading force to be applied through each of these bolts when tightened, even though the adjacent plates are not positioned in parallel planes. Such spherical seating washers 119, 119a and 119b compensate for such misalignment at the joint face and eliminate any bending force from being applied to the mounting bolts to ensure true axial loading.

While this invention is described and shown for use with an articulated off-highway truck, it is to be understood that the invention could be adapted to function just as well with other vehicles utilizing a moveable blade for facilitating the discharge of materials carried by the vehicle. This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims:

What is claimed is:

1. An ejector blade carriage adjustment system for securing the relative position between an ejector blade and an ejector blade carriage to facilitate movement of the ejector blade between a load position and a discharge position by compensating for variations in the fabrication of the vehicle structural components used in association with the movement of the ejector blade and ejector blade carriage, comprising:

an ejector blade extending substantially the width of the interior of a vehicle in which the ejector blade is carried, said ejector blade being operable between a load position and a discharge position for moving materials out from the vehicle in which said ejector blade is carried;

an ejector blade carriage adapted to be connected to said ejector blade to facilitate the movement of said ejector blade between said load position and said discharge position; and a tri-bolt connection joining said ejector blade carriage to said ejector blade;

said tri-bolt connection forming a triangular-shaped bolt pattern; and at least one bolt of said tri-bolt connection including a spacing shim for determining the space between said ejector blade carriage and said ejector blade, and at least one spherical seating washer for controlling the direction of a loading force applied to said at least one bolt when said ejector blade carriage is joined with said ejector blade by the tightening of said bolt.

2. The ejector blade carriage adjustment system of claim 1 wherein each tri-bolt connection includes three bolts arranged in a triangular-shaped pattern, each of said bolts including a space adapted to receive a spacing shim, and at least one spherical seating washer for controlling the direction of a loading force applied to said bolts when said ejector blade carriage is joined with said ejector blade by the tightening of said bolts.

3. The ejector blade carriage adjustment system of claim 2 wherein said triangular-shaped pattern formed by said tri-bolt connection includes one of said bolts being positioned at an apex of the triangular-shaped pattern above said other two bolts.

4. The ejector blade carriage adjustment system of claim 3 wherein said other two bolts of said tri-bolt connection are spaced apart to form a base of said triangular-shaped pattern.

5. The ejector blade carriage adjustment system of claim 1 further including a lock-bolt for securing said ejector blade carriage to said ejector blade subsequent to the tightening of said tri-bolt connection.

6. The ejector blade carriage adjustment system of claim 5 wherein said lock-bolt includes a space adapted to receive a spacing shim, and at least one spherical seating washer for controlling the direction of a loading force applied thereto when said lock-bolt is tightened to secure said ejector blade carriage to said ejector blade.

7. The ejector blade carriage adjustment system of claim 1 including two tri-bolt connections, one of said tri-bolt connections joining a top portion of the ejector blade to an ejector blade carriage at each end of said ejector blade adjacent to the vehicle interior.

8. A method of adjusting the relative positions between an ejector blade and an ejector blade carriage joined thereto by bolting to facilitate movement of the ejector blade between a load position and a discharge position by compensating for variations in the fabrication of structural components of a vehicle in which the ejector blade and ejector blade carriage are carried, comprising:

joining an ejector blade carriage to an ejector blade by a tri-bolt connection arranged in a triangular-shaped pattern;

said tri-bolt connection including at least one bolt carrying a spacing shim for adjusting the space between said ejector blade and said ejector blade carriage, and at least one spherical seating washer for controlling the direction of a loading force applied to said at least one bolt when said ejector blade carriage is joined to said ejector blade; and tightening said at least one bolt thereby adjusting the relative position between said ejector blade and said ejector blade carriage, and applying said tightening force to said at least one bolt in an axial direction.

9. The method of claim 8 wherein said tri-bolt connection includes:

three bolts arranged in a triangular-shaped pattern;

each one of said three bolts joining said ejector blade carriage to said ejector blade including a space adapted to receive a spacing shim, and at least one spherical seating washer for controlling the direction of the loading force applied to said bolts when said ejector blade carriage is joined to said ejector blade;

placing a spacing shim on at least one of said three bolts to adjust the spacing between said ejector blade carriage and said ejector blade; and tightening said three bolts thereby adjusting the relative position between said ejector blade carriage and said ejector blade, and applying said tightening force to said three bolts in an axial direction.

10. The method of claim 9 further including joining said ejector blade carriage and said ejector blade by tightening a lock bolt subsequent to the tightening of said three bolts forming said tri-bolt connection.

* * * * *